(12) United States Patent
Yakake et al.

(10) Patent No.: US 7,585,795 B2
(45) Date of Patent: Sep. 8, 2009

(54) SHEET AND INTERIOR MATERIAL

(75) Inventors: Yoshikazu Yakake, Omihachiman (JP);
Masaru Ueno, Anpachi-gun (JP);
Makoto Nishimura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 11/547,149

(22) PCT Filed: Mar. 29, 2005

(86) PCT No.: PCT/JP2005/005793

§ 371 (c)(1),
(2), (4) Date: Sep. 29, 2006

(87) PCT Pub. No.: WO2005/095706

PCT Pub. Date: Oct. 13, 2005

(65) Prior Publication Data

US 2007/0197116 A1 Aug. 23, 2007

(30) Foreign Application Priority Data

Mar. 30, 2004 (JP) ............................. 2004-098099
Apr. 15, 2004 (JP) ............................. 2004-119938

(51) Int. Cl.
*D04H 3/00* (2006.01)
*D04H 1/00* (2006.01)
*D04H 5/00* (2006.01)

(52) U.S. Cl. ........................ 442/334; 442/327; 442/328; 442/333

(58) Field of Classification Search ................ 442/327, 442/333, 334, 328
See application file for complete search history.

(56) References Cited

U.S. PATENT DOCUMENTS 6,811,572 B2 * 11/2004 Hashimoto et al. ........... 8/94.15

FOREIGN PATENT DOCUMENTS

| JP | 59-192779 | 11/1984 |
| JP | 59192779 A | 11/1984 |
| JP | 02-033384 | 2/1990 |
| JP | 03-244619 | 10/1991 |
| JP | 4-93316 A | 3/1992 |
| JP | 04-202861 | 7/1992 |
| JP | 04-300368 | 10/1992 |
| JP | 05-005280 | 1/1993 |
| JP | 05-009875 | 1/1993 |
| JP | 5-59674 A | 3/1993 |
| JP | 07-150478 | 6/1995 |
| JP | 2002-030579 | 1/2002 |

OTHER PUBLICATIONS

International Search Report, application No. PCT/JP2005/005793 dated Aug. 16, 2005.

* cited by examiner

*Primary Examiner*—Lynda Salvatore
(74) *Attorney, Agent, or Firm*—RatnerPrestia

(57) ABSTRACT

A sheet comprising a non-woven fabric in which ultra-fine fibers of a single fiber thickness of 0.5 dtex or less are entangled and an elastomeric binder mainly composed of a polyurethane, wherein the polyurethane is a polycarbonate-based polyurethane having a polycarbonate skeleton represented by both of the following general formulas (1) and (2), and having a gelation point of 2.5 ml or more and less than 6 ml.

[Formula 1]

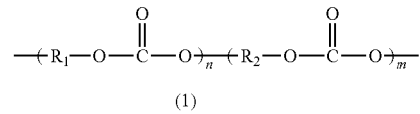

(1)

$R_1$ and $R_2$ are aliphatic hydrocarbon groups with 7 to 11 carbons, and they may be same or different, n and m are positive integers, and when $R_1$ and $R_2$ are different, it is a block copolymer or a random copolymer.

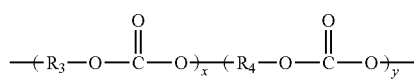

(2)

$R_3$ and $R_4$ are aliphatic hydrocarbon groups with 3 to 6 carbons, and they may be same or different, x and y are positive integers, and when $R_3$ and $R_4$ are different, it is a block copolymer or a random copolymer.

18 Claims, No Drawings

SHEET AND INTERIOR MATERIAL

This is a U.S. National Phase application of application number PCT/JP2005/00573, filed Mar. 29, 2005.

TECHNICAL FIELD

This invention relates to a sheet, in particular, to a napped leather-like sheet

BACKGROUND TECHNOLOGY

It is well known to obtain a suede- or nubuck-like napped leather-like sheet by raising surface fibers of a sheet, in which a fiber substrate is impregnated with a polyurethane resin, using a sandpaper or the like. Characteristics of the sheet to be made can be arbitrarily and widely designed by combination of the substrate comprising fibers and the polyurethane resin. For example, in patent reference 1, it is disclosed that an artificial leather-like product having a very soft touch and is not inferior to a high quality wool fabric which is used for a suit, etc., by using a polyurethane resin comprising polytetramethylene glycol, an organic diisocyanate and a glycol chain extender.

On the other hand, the napped leathery sheet has an appearance and surface similar to those of natural leather, and advantageous features such as uniformity or color fastness, which natural leathers do not have, are recognized, and its applications are spreading in not only for clothing, but also, recently, for long term applications of 5 to 10 years such as covers for furniture such as sofa and covers for car seat.

Therefore, there was a problem that a polyether-based polyurethane resin such as those described in the patent reference 1 cannot be, because it may easily deteriorate by ultra-violet light or by heat, durable for a long term use due to falling off or pilling of surface fibers during use. In addition, although a polyester-based polyurethane resin, which is a polyurethane widely used for leather-like sheet, is good in light resistance to ultra-violet light, etc., its ester bond decomposes by hydrolysis, and there is also a problem to cause and pilling during a long term use.

In the patent reference 2, it is disclosed that a polycarbonate-based polyurethane resin, obtained by reacting a polycarbonate diol, an alicyclic polyisocyanate and an aromatic polyisocyanate, is a useful polyurethane resin for use in which a high durability is required such as for furniture and car seat. However, when the polycarbonate-based polyurethane resin, in which polyhexamethylene carbonate is used, described there, is used as a resin to impregnate into an ultra-fine fiber entangled non-woven fabric, the hand of the sheet becomes plastic-like and stiff. In particular, when the fibers on the surface are raised by a sandpaper or the like, since the polyurethane is too stiff, the surface becomes coarse with short surface fibers, and it is quite difficult to attain a high quality with elegant napped fibers.

In the patent reference 3, for the purpose of making napped fiber quality compatible with durability such as light resistance and hydrolysis resistance, napped leather-like sheets in which a polycarbonate/polyether-based polyurethane resin or a polycarbonate/polyester-based polyurethane resin in which polycarbonate diol, mainly 30 to 90 wt % of polyhexamethylene carbonate diol, and polyether or polyester diol, are used, is disclosed. However, when the ratio of polycarbonate diol is less than 70 wt %, the durability of the product becomes insufficient due to deterioration of polyether component or polyester component, on the other hand, when the ratio of the polycarbonate diol is 70 wt % or more, polyurethane becomes too stiff, and when its surface is buffed with a sandpaper or the like, surface napped fibers become short and coarse, and it was impossible to obtain a napped fiber type leather-like sheet which is satisfactory in napped fiber quality and durability.

On the other hand, in a leathery sheet in which a resin layer is coated or laminated on a fiber substrate, so-called synthetic leather, it is known to use a polycarbonate-based polyurethane resin as the resin layer to improve durability. Mainly for purpose of improving hand of the synthetic leather, various proposals are made for the polycarbonate-based polyurethane to be used for the resin layer.

For example, in patent reference 4, a polyurethane resin in which a copolycarbonate diol made from 1,6-hexane diol and 1,5-pentane diol, is used and a polyurethane resin in which a copolycarbonate diol made from 1,6-hexane diol and 1,4-butane diol is used, are disclosed. In patent reference 5, a polyurethane resin in which a polycarbonate diol made from 2-methyl-1,8-octane diol, is disclosed. In patent reference 6, a polyester/polycarbonate-based polyurethane resin in which both of a polyester diol made from an alkane diol with 5 to 6 carbons and a dicarboxylic acid and a polycarbonate diol made from an alkane diol with 8 to 10 carbons, is disclosed. And, in patent reference 7, a polycarbonate/polyether-based polyurethane resin in which both of a polycarbonate diol made from an alkane diol with 8 to 10 carbons and a polyether diol are used, is disclosed.

When these polyurethane resins are applied to a sheet as an impregnating resin to an ultra-fine fiber entangled non-woven fabric to be present inside spaces of the non-woven fabric, in particular, to a napped leather-like sheet of which surface is buffed with a sandpaper or the like to raise the surface fiber for example, when the copolycarbonate-based polyurethane resin with 4 to 6 carbons described in the patent reference 4 is used, a softening effect to a degree capable of being buffed with a sandpaper cannot be attained, and results in a coarse surface with short surface naps and it is quite difficult to obtain a good quality with excellent naps. Moreover, since the long chain alkylene diol is used, the polycarbonate-based polyurethane resin made from 2-methyl-1,8-octane diol described in the patent reference 5 coagulates too fast when wet-coagulated after impregnation into a non-woven fabric, and voids in polyurethane inside the non-woven fabric become large and coarse, moreover, it causes a partial insufficient foaming, and as a result, when the surface is buffed by a sandpaper, there is a problem that only a product of very poor napped fiber quality with uneven surface nap length can be obtained. In addition, when the surface of the obtained sheet is rubbed with a brush or the like, falling off of fibers was significant, and there was a problem in durability. The polyurethane resins described in patent references 6 and 7, because it uses both of polyester diol and polyether diol, in view of hydrolysis resistance or light resistance, cannot improve durability for a long term use, in particular, the problem of generating pilling, of surface fiber of napped leather-like sheet.

In addition, the technologies described in the patent references 4 to 7 aim to improve surface physical properties such as greasy touch, surface smoothness, tackiness or crack of the polyurethane resin layer provided mainly on the substrate, and they did not consider anything about improving capability of being buffed with a sandpaper or the like when the polyurethane resin is present inside the non-woven fabric, to thereby exhibit preferable ultra-fine fiber nap length, an elegant appearance or flexible surface touch based on the naps, and a soft hand.

On the other hand, in patent reference 8, a soft fibrous sheet in which a thermoplastic polyurethane having a silicone segment in its main chain and/or side chain is used, and a polyurethane-based multi-component fiber suitable for producing the fibrous sheet, are disclosed. When a sheet made thereof is buffed with a sandpaper or the like, since the polyurethane is contained inside the ultra-fine fiber bundle and the polyurethane adheres with the respective single fibers, fiber breakage at buffing is serious and not only insufficient for obtaining an elegant appearance of the napped fibers, but also it was unsatisfactory in softness and hand of sheet.

Furthermore, in patent reference 9, a sheet and a production method thereof in which a polyurethane resin modified with a silicone polyol having, based on polymer diol component, 5 to 30 wt % dimethyl siloxane structural unit, is present in a state such that it is substantially not present inside the ultra-fine fiber bundle which constitutes the non-woven fabric. However, as for the silicone polyol, there is only a description about a dimethylsiloxane structure with hydroxyl group at both ends. This polyurethane resin obtained by using the silicone polyol having hydroxyl group at both ends is a block copolymer in which the dimethyl siloxane chain is introduced to the polyurethane main chain. When a sheet impregnated with the polyurethane resin comprising, as main component, the polycarbonate modified with the silicone polyol having-hydroxyl group at both ends, is subjected to a raising treatment by an ordinary buffing, in order to obtain a preferable nap fiber length and an elegant appearance, it becomes necessary that the content of the silicone polyol is at least 10 wt % or more based on the polymer diol comprising polycarbonate diol as main component, but when 10 wt % or more silicone polyol is contained in the polyurethane resin, the light resistance of the polyurethane resin worsens greatly to thereby generate fluff or pilling of fibers and a product satisfactory in durability was not obtained.

As stated above, by conventional techniques, it is quite difficult to stably produce a napped leather-like sheet excellent in every of hand, nap fiber quality and durability.

[Patent reference 1] JP-A-S59-192779
[Patent reference 2] JP-A-H3-244619
[Patent reference 3] JP-A-2002-30579
[Patent reference 4] JP-A-H5-5280
[Patent reference 5] JP-A-H2-33384
[Patent reference 6] JP-A-H4-300368
[Patent reference 7] JP-A-H5-9875
[Patent reference 8] JP-A-H4-202861
[Patent reference 9] JP-A-H7-150478

DISCLOSURE OF THE INVENTION

Problem to be Solved by the Invention

The purpose of the present invention is, in view of the background of the conventional techniques, to provide a napped leather-like sheet having an elegant appearance by nap fibers, a hand similar to natural leather, and further even for a long term use, a high durability with less falling off, fluff and pilling of fibers.

Means for Solving the Problem

The present invention has the following constitutions for solving the above-mentioned problem.

That is, the sheet of the present invention is a sheet comprising a non-woven fabric in which ultra-fine fibers of a single fiber fineness of 0.5 dtex or less are entangled and an elastomeric binder mainly composed of a polyurethane, wherein said polyurethane is a polycarbonate-based polyurethane having a polycarbonate skeleton represented by the following general formulas (1) and (2), and having a gelation point of 2.5 ml or more and 6 ml or less.

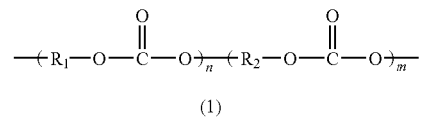

(1)

(In the formula, $R_1$ and $R_2$ are aliphatic hydrocarbon groups with 7 to 11 carbons, and they may be same or different. And, n and m are positive integers, and when $R_1$ and $R_2$ are different, it is a block copolymer or a random copolymer)

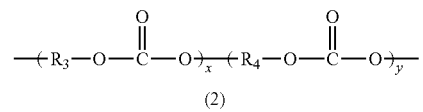

(2)

(In the formula, $R_3$ and $R_4$ are aliphatic hydrocarbon groups with 3 to 6 carbons, and they may be same or different. And, x and y are positive integers, and when $R_3$ and $R_4$ are different, it is a block copolymer or a random copolymer)

More preferably, said polyurethane further has a side chain containing a polyorganosiloxane skeleton represented by the following general formula (3)

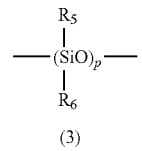

(3)

(In the formula; $R_5$ and $R_6$ are aliphatic hydrocarbon groups or an aryl groups, and they may be same or different. And, p is a positive integer)

In addition, the interior material of the present invention is made of the above-mentioned sheet.

Effect of the Invention

According to the present invention, it is possible to provide a napped leather-like sheet having an elegant appearance and excellent in durability such as hydrolysis resistance and light resistance.

Best Embodiment for Carrying Out the Invention

The sheet of the present invention comprises a non-woven fabric in which ultra-fine fibers of a single fiber fineness of 0.5 dtex or less are entangled and an elastomeric binder of which main component is polyurethane.

As materials constituting the ultra-fine fibers, thermoplastic resins capable of melt-spinning, for example, polyesters such as polyethylene terephthalate, polybutylene terephthalate and polytrimethylene terephthalate, polyamides such as nylon 6, nylon 66, can be used. Among them, in view of strength, dimensional stability and light resistance, it is preferable to use a polyester. In addition, ultra-fine fibers of a different material may be mixed to the non-woven fabric.

It is important that a single fiber fineness of the ultra-fine fibers constituting the non-woven fabric is, in view of softness and napped fiber quality of the sheet, it is important to be 0.5 dtex or less. More preferably, it is 0.3 dtex or less, still more preferably, 0.2 dtex or less. On the other hand, in view of coloration after dyeing or dispersibility or separability of bundle fibers at raising treatment by buffing, it is preferable to be 0.005 dtex or more, and more preferable to be 0.01 dtex or more. The single fiber fineness mentioned here is the value determined by cutting the obtained sheet in thickness direction, observing the cross section with a scanning electron microscope (SEM), measuring ultra-fine fiber diameter at arbitrarily chosen 100 portions, calculating them into average value and converting it into dtex from specific density of the thermoplastic resin used for the ultra-fine fibers.

As methods for obtaining the ultra-fine fibers, it is preferable to use a fiber capable of converting into ultra-fine fibers. As the fiber capable of converting into ultra-fine fibers, an island-in-sea type composite fibers in which two thermoplastic components different in solubility against a solvent are used as the sea component and the island component, and capable of converting it into ultra-fine fibers by dissolving out only the sea component by the solvent or the like, or a separable type composite fiber or a multi-layer type composite fiber in which two thermoplastic components are disposed radially or in alternative layers in fiber cross section and capable of separating them into ultra-fine fibers by peeling off the respective components, etc., can be used.

As the non-woven fabric, those in which single fiber of the ultra-fine fibers entangles respectively or those in which ultra-fine fiber bundle entangles can be used, but those in which ultra-fine fiber bundle entangles is preferable in view of strength and hand of the sheet. In view of softness and hand, those having proper spaces between the ultra-fine fibers inside the fiber bundle are especially preferable. Such a non-woven fabric in which ultra-fine fiber bundle entangles can be obtained by entangling the fiber capable of converting into ultra-fine fibers and then converting it into ultra-fine fibers. In addition, those having proper spaces between the ultra-fine fibers inside the fiber bundle can be made by using the island-in-sea type composite fiber capable of imparting proper spaces between the island components, namely, between the ultra-fine fibers inside the bundle by removing the sea component.

As the island-in-sea type composite fiber, alternate polymer arrangement method in which two components of island and sea are melted, arranged alternately and spun using an island-in-sea type composite spinneret and blend spun method in which two components of island and sea are spun in melt-blended state, etc., can be applied, but the alternate polymer arrangement method is preferable in view of being able to obtain ultra-fine fibers of uniform fineness.

In particular, as for the uniformity of fiber fineness, it is preferable that the CV (coefficient of variation) of fiber fineness in the fiber bundle is 10% or less. The CV (coefficient of variation) of mentioned here means standard deviation of fiber fineness of the fibers constituting the bundle divided by the average fiber fineness in the bundle expressed in percentage, and as the value becomes smaller, the more uniform the-fineness becomes. By making the CV (coefficient of variation) of fiber fineness 10% or less, it becomes possible to make appearance of naps on the sheet surface elegant and dyeing uniform and high quality.

As the sea component of the island-in-sea type composite fiber, polyethylene, polypropylene, polystyrene, copolyester having sodium sulfoisophthalate or polyethylene glycol, etc., as copolymerization component, polylactide, etc., can be used. As solvent to dissolve out the sea component, in case of polyethylene, polypropylene or polystyrene, organic solvents such as toluene or trichloroethylene, in case of copolyester or polylactide, aqueous alkali solution such as of sodium hydroxide can be used. By subjecting to immersing the island-in-sea type composite fiber into the solvent and squeezing, the sea component can be removed.

The cross section configuration on the ultra-fine fibers may, usually, be round, but uncircular cross-sections such as elliptic, flat, polygonal such as triangular, flabellate or cross may be adopted.

The non-woven fabric constituting the sheet of the present invention, may be any one of staple fiber non-woven fabric and long fiber non-woven fabric, if hand or quality in appearance is important, staple fiber non-woven fabric is preferable. In addition, inside the non-woven fabric, a woven or knitted fabric may be inserted for the purpose of improving strength.

As methods for obtaining the non-woven fabric by entangling the ultra-fine fibers, entanglements by needle punching or water jet punching can be applied.

It is important that the-polyurethane used as the main component of the elastomeric binder used in the present invention is a polycarbonate-based polyurethane having a polycarbonate skeleton represented by the following general formulas (1) and (2).

[Formula 4]

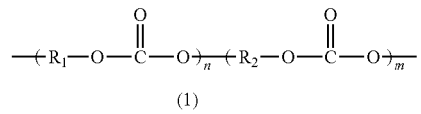

(1)

(In the formula, $R_1$ and $R_2$ are aliphatic hydrocarbon groups with 7 to 11 carbons, and they may be same or different. Furthermore, n and m are positive integers, and when $R_1$ and $R_2$ are different, it is a block copolymer or a random copolymer)

[Formula 5]

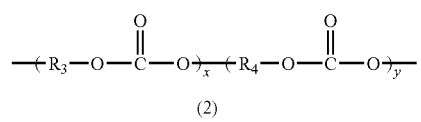

(2)

(In the formula, $R_3$ and $R_4$ are aliphatic hydrocarbon groups with 3 to 6 carbons, and they may be same or different. Furthermore, x and y are positive integers, and when $R_3$ and $R_4$ are different, it is a block copolymer or a random copolymer)

That is, by containing a different structure of polycarbonate skeleton having a polycarbonate skeleton having a long chain aliphatic hydrocarbon groups with 7 to 11 carbons such as represented by the general formula (1) as well as a short chain aliphatic hydrocarbon group with 3 to 6 carbons such as represented by the general formula (2), the polyurethane may become amorphous and may have a suitable stiffness to be buffed with a sandpaper or the like, and it becomes possible to obtain a very good fiber naps on surface.

$R_1$, $R_2$ represented by the above-mentioned general formula (1) and $R_3$, $R_4$ represented by the above-mentioned general formula (2) may be a same aliphatic hydrocarbon group or may be different aliphatic hydrocarbon groups, respectively, but if they are different aliphatic hydrocarbon groups, respectively, the polyurethane may have a more amorphous structure, and it is preferable because softness and nap quality of the obtained sheet may be more improved.

Furthermore, the polycarbonate skeletons represented by the above-mentioned general formulas (1) and (2) may be any one of a block copolymer or a random copolymer, but a random copolymer is preferable because the polyurethane may become more amorphous.

Similarly, in view of softness and nap quality of the sheet, more preferably, all of $R_1$, $R_2$, $R_3$ and $R_4$ are different aliphatic hydrocarbons. In particular, at least one of $R_1$ and $R_2$, or at least one of $R_3$ and $R_4$ is preferably an aliphatic hydrocarbon group from which methyl or ethyl group branches off.

The polyurethane used in the present invention may contain five or more species of polycarbonate skeletons as far as it contains at least one species of the polycarbonate skeleton having a long chain aliphatic hydrocarbon groups with 7 to 11 carbons and the polycarbonate skeleton having a short chain aliphatic hydrocarbon group with 3 to 6 carbons.

More preferably, such a polyurethane has a side chain containing a polyorganosiloxane skeleton represented by the following general formula (3).

[Formula 6]

(3)

(In the formula, $R_5$ and $R_6$ are aliphatic hydrocarbon groups or an aryl groups, and they may be same or different. And p is a positive integer)

The sheet of the present invention can preferably and finally be used as a napped leather-like sheet on at least one surface of which, the ultra-fine fibers are raised. And the raising treatment can be done by buffing with a sandpaper or a roll sander, but usually, in order to obtain a good fiber naps on surface, imparting a lubricant such as a silicone emulsion is preferably applied before buffing treatment.

However, when the lubricant was used, the powder generated from the sheet by buffing was accumulated on the sandpaper greatly to cause a rapid clogging, and the productivity was likely to decrease.

On the other hand, by modifying such a polyurethane to those having a side chain containing a polyorganosiloxane skeleton represented by the above-mentioned general formula (3), even if a lubricant such as the silicone emulsion is not imparted before the buffing treatment, it is possible to obtain an excellent fiber naps on surface, and further, it is possible to avoid decrease of productivity at the buffing treatment.

$R_5$ and $R_6$ represented by the above-mentioned general formula (3) are aliphatic hydrocarbon groups or aryl groups, and they may be same or different, but it is preferable that both of $R_5$ and $R_6$ are methyl group in view of production cost. And, p is a positive integer. It is preferable that p is 100 to 300 in view of controlling the number average molecular weight (Mn) of the silicone polyol (C) mentioned later. Such a polyorganosiloxane skeleton is essential to achieve an elegant napped fiber configuration, but on the other hand, if it is contained too much, the light resistance of the polyurethane falls significantly and the polyurethane deteriorates. For that reason, a pilling of fiber may be produced and the aimed durability of the napped leather-like sheet may not be attained. However, by the silicone polyol being contained in the side chain, even in a small amount, it is possible to obtain an elegant appearance and quality, and accordingly, it is possible to obtain a leather-like sheet provided with both of an elegant quality and durability.

It is preferable that such a polyurethane is, more concretely saying, that obtained by reaction of the polycarbonate diol (A) having hydroxyl group at both ends of molecular chain having the polycarbonate skeleton represented by the above-mentioned general formula (1), the polycarbonate diol (B) having hydroxyl group at both ends of molecular chain having the polycarbonate skeleton represented by the above-mentioned general formula (2), an organic diisocyanate and a chain extender. And it is more preferable that such a polyurethane is that obtained by reaction further including a silicone polyol (C) having two hydroxyl groups at only one end of molecular chain having the polyorganosiloxane skeleton represented by the above-mentioned general formula (3).

The polycarbonate skeleton of the present invention is that which forms a polymer chain connected via carbonate bonds, and the polycarbonate diol is that which has one hydroxyl group, respectively, at both ends of said polymer chain. The polycarbonate diol can be produced by an ester interchange reaction between an alkylene glycol and a carbonic acid ester, or by a reaction between fosgen or chloroformic acid ester and an alkylene glycol, etc.

As alkylene glycols for obtaining the polycarbonate diol (A) having the polycarbonate skeleton having a long chain aliphatic hydrocarbon group with 7 to 11 carbons represented by the above-mentioned general formula (1), linear chain alkylene glycols such as 1,7-heptane diol, 1,8-octane diol, 1,9-nonane diol and 1,10-decane diol, branched chain alkylene glycols such as 2-methyl-1,8-octane diol, 2,7-dimethyl-1,8-octane diol and 2,8-dimethyl-1,9-nonane diol, can be used. Linear chain alkylene glycol obtained from such as 1,9-nonane diol and 2-methyl-1,8-octane diol and copolymerized polycarbonate diol obtained from branched alkylene glycol are especially preferable, because of the softness of the napped leather-like sheet and the easiness of buffing by sandpaper or the like which may bring about a high nap quality.

As alkylene glycols for obtaining the polycarbonate diol (B) having the polycarbonate skeleton containing a long chain aliphatic hydrocarbon group with 3 to 6 carbons represented by the above-mentioned general formula (2), linear chain alkylene glycols such as 1,3-propane diol, 1,4-butane diol, 1,5-pentane diol, 1,6-hexanediol, branched alkylene glycols such as propylene glycol, neopentyl glycol, 3-methyl-1,5-pentane diol, can be used. Linear chain alkylene glycol obtained from such as 1,6-hexane diol and 3-methyl-1,5-pentane diol and copolymerized polycarbonate diol obtained from a branched alkylene glycol are especially preferable, because of the softness of the obtained napped leather-like sheet and the easiness of buffing by sandpaper or the like which may bring about a high nap quality. As carbonic acid ester used for the ester interchange reaction, diethyl carbonate and diphenyl carbonate, etc., are mentioned.

As the number average molecular weight (Mn) of the polycarbonate diols (A) and (B), 500 to 3,000 is preferable and more preferably it is 1,500 to 2,500. By controlling the number average molecular weight to 500 or more, it is possible to prevent that the hand becomes stiff, and by controlling it to 3,000 or less, it is possible to keep strength as a polyurethane.

The silicone polyol (C) is not a compound which has one respective hydroxyl group at both ends of the polymer chain, but a compound which have two hydroxyl groups at one end only of the polymer chain. By such a structure, it is possible to obtain a polyurethane having a polyorganosiloxane skeleton not in the linear chain but in the side chain.

As the number average molecular weight of the silicone polyol (C), 500 to 30,000 is preferable. If the number average molecular weight is 500 or less, the naps of the sheet may become short when napping treatment by sandpaper or the like is carried out, and on the contrary, if it is 30,000 or more, compatibility of the silicone polyol (C) and other polyol becomes worse and a stable polyurethane may not be obtained. As for the number average molecular weight, more preferably it is in the range of 5,000 to 25,000, particularly preferably in the range of more than 10,000 and 20,000 or less. In particular, when a silicone polyol of number average molecular weight in the range of more than 10,000 and 20,000 or less is used, even if its amount is small, a leather-like sheet very excellent in nap quality and appearance can be obtained.

As for a ratio of the silicone polyol (C) to the total of the polycarbonate diols (A) and (B), it is preferably 0.1 wt % or more and 5 wt % or less. It is more preferably 0.5 to 4 wt %, still more preferably 1 to 3 wt %. By controlling the ratio of the silicone polyol (C) to 0.1 wt % or more, it is possible to attain an aimed nap length by buffing with a sandpaper or the like. And, by controlling it to 5 wt % or less, it is possible to avoid an aggravation of light resistance.

And, in view of improving durability such as hydrolysis resistance and light resistance, as polymer diols used for synthesizing the polyurethane, it is preferable not to use other polyether diol or other polyester diol than the polycarbonate diol and the silicone polyol.

As organic diisocyanate used for synthesis of the polyurethane, for example, aromatic diisocyanates such as 4,4'-diphenylmethane diisocyanate, p-phenylene diisocyanate, 1,5-naphthalene diisocyanate, p-xylene diisocyanate and m-xylene diisocyanate, alicyclic diisocyanates such as 4,4'-dicyclohexylmethane diisocyanate and isophorone diisocyanate, aliphatic diisocyanates such as 1,6-hexamethylene diisocyanate, can be mentioned. Among them, in view of strength, durability such as heat resistance, it is preferable to use an aromatic diisocyanate, especially to use 4,4'-diphenylmethane diisocyanate.

As for a ratio of the polycarbonate diols (A) and (B) in total and the organic diisocyanate, it is preferable to control the mol ratio of both components to 1:2 to 1:5. And, in this range, it is possible to control, by decreasing the ratio of the organic diisocyanate in case where softness of the obtained polyurethane is important, or by increasing the ratio of the organic diisocyanate in case where strength, heat resistance and durability are important.

In addition, in case where the silicone polyol (C) is further included, as for a ratio of the polycarbonate diols (A) and (B) and the silicone polyol (C) in total and the organic diisocyanate, it is preferable to control the mol ratio of both components to 1:2 to 1:5. And, in this range, it is possible to control, by decreasing the ratio of the organic diisocyanate in case where softness of the obtained polyurethane is important, or by increasing the ratio of the organic diisocyanate in case where strength, heat resistance and durability are important.

As the chain extender for the synthesis of the polyurethane, an organic diol, an organic diamine, a hydrazine derivative, etc., can be used.

As examples of the organic diol, aliphatic diols such as ethylene glycol, propylene glycol, 1,4-butanediol, neopentyl glycol, 1,5-pentanediol, methylpentanediol, 1,6-hexanediol, 1,7-heptanediol, 1,8-octanediol, 1,9-nonanediol and 1,10-decanediol, alicyclic diols such as 1,4-cyclohexanediol and hydrogenated xylylene glycol, aromatic diols such as xylylene glycol, can be mentioned.

As examples of organic diamine, ethylenediamine, isophorone diamine, xylene diamine, phenyl diamine, 4,4'-diaminodiphenylmethane, etc., can be mentioned.

As examples of hydrazine derivative, hydrazine, adipinic dihydrazide, isophthalic hydrazide, etc., can be mentioned.

In case where hydrolysis resistance of the polyurethane is important, it is preferable to use an organic diol and among them, in view of strength, heat resistance and yellowing resistance of the polyurethane, aliphatic diol with 2 to 6 carbons of alkyl chain, especially ethylene glycol is preferable. And, in case where heat resistance of the polyurethane is important, it is preferable to use organic diamines, and among them, it is preferable to use aromatic diamines such as 4,4'-diaminodiphenylmethane or 4,4'-diphenylmethane diisocyanate with water to convert them into 4,4,-diaminodiphenylmethane.

When the polyurethane is synthesized, as a catalyst, for example, amines such as triethylamine, tetramethylbutanediamine, metal compounds such as potassium acetate, zinc stearate, tin octylate may be used.

The weight average molecular weight (Mw) of the polyurethane is preferably 100,000 to 300,000, more preferably 150,000 to 250,000. By making the weight average molecular weight (Mw) to 100,000 or more, it is possible to maintain strength of the obtained sheet and to prevent generation of fluff or pilling. And, by making it to 300,000 or less, it is possible to suppress viscosity increase of the polyurethane solution to thereby make it easy to impregnate into the nonwoven fabric.

And, as for the polyurethane used as main component of the elastomeric binder of the present invention, it is important that the gelation point is 2.5 ml or more and less than 6 ml. More preferably it is in the range of 3 ml to 5 ml. The gelation point defined in the present invention is the amount of dropped water when the solution becomes slightly turbid due to starting coagulation of the polyurethane, when distilled water is dropped to 100 ml of 1 wt % polyurethane solution in N,N'-dimethylformamide (hereafter, abbreviated as DMF) while stirring at a temperature condition of 25° C.±1° C. For that reason, for the measurement, it is necessary to use a DMF of water content of less than 0.03 wt %. The above-mentioned measurement is described on the assumption that the polyurethane solution in DMF is transparent, but in case where the polyurethane solution in DMF is slightly turbid at first, the amount of dropped water when the turbidity starts to increase by starting coagulation of the polyurethane can be considered as the gelation point. And, the gelation point of the polyurethane which is present in the sheet can be determined by extracting polyurethane with DMF from the sheet and by adjusting polyurethane concentration to 1 wt %.

This gelation point means a degree of permissible water content when the polyurethane is wet coagulated using the polyurethane solution in DMF, and those which have a low gelation point may have a rapid coagulation speed and those which have a high gelation point may have a slow coagulation speed. For that reason, in case where the gelation point is less than 2.5 ml, coagulation speed becomes too high when the polyurethane resin is wet coagulated, and as a result, voids of polyurethane inside the non-woven fabric become large and coarse, moreover, it causes a partial insufficient foaming, and as a result, when the sheet is buffed with a sandpaper, only a product of very poor napped fiber quality with uneven surface nap length can be obtained. In addition, because the polyurethane film becomes thin, the effect as a binder for fixing between the fibers is small, and there is a problem that, when the surface of the obtained sheet is rubbed with a brush or the like, falling off of fibers was significant. On the other hand, in case where the gelation point is 6 ml or more, the coagulation speed becomes too low when the polyurethane resin is wet coagulated, and as a result, voids of polyurethane inside the non-woven fabric are little observed and the polyurethane is present as a very thick and stiff polyurethane, and when the surface of the sheet is buffed, buffing of the polyurethane is not easy to thereby bring about a product with very short surface naps and of low quality.

In order to adjust the gelation point of the polyurethane used in the present invention to from 2.5 ml to 6 ml, although it depends on kind or amount of the silicone polyol (C), organic diisocyanate and the chain transfer agent, it is possible to control the gelation point by the weight ratio of the polycarbonate diol (A) which has a polymer chain comprising the polycarbonate skeleton represented by the above-mentioned general formula (1) with hydroxyl group at both ends of the polymer chain and the polycarbonate diol (B) which has a polymer chain comprising the polycarbonate skeleton represented by the above-mentioned general formula (2) with hydroxyl group at both ends of the polymer chain.

In the aimed range of the gelation point, in order to keep the gelation point low, the ratio of the polycarbonate diol (A) should be high, and on the contrary, in order to raise the gelation point, the ratio of the polycarbonate diol (A) should be low, and thus, the gelation point can be controlled.

And, as the elastomeric binder, the polyurethane used as the main component is used, but as far as in the range which does not spoil the properties as binder or hand, elastomeric resins such as polyester-based, polyamide-based and polyolefin-based resins, acryl resin, ethylene-vinyl acetate resin, etc., may be included. And, various additives, for example, pigments such as carbon black, flame retardants such as a phosphorous-based, a halogen-based and an inorganic substance-based ones, antioxidants such as a phenol-based, a sulfur-based and a phosphorous-based, ultra-violet absorbents such as a benzotriazole-based, a benzophenone-based, a salicylate-based, a cyanoacrylate-based, an oxalic acid anilide-based ones, light stabilizers such as a hindered amine-based and benzoate-based ones, hydrolysis stabilizer such as a polycarbodiimide, plasticizer, an antistatic agent, a surfactant, a coagulation controlling agent, a dye, etc., may be included.

It is stated in the above that the non-woven fabric used for the sheet of the present invention, is preferably a non-woven fabric in which ultra-fine fiber bundles are entangled, but in such a case, it is preferable that the elastomeric binder mainly comprising polyurethane, is substantially not present inside the ultra-fine fiber bundle. If the elastomeric binder is present inside the ultra-fine fiber bundle, it may become difficult to obtain an excellent hand which can be attained by spaces inside the fiber bundle. That is because the binder adheres to single fibers of the ultra-fine fibers which constitute the fiber bundle, when it is subjected to raising treatment by sandpaper or the like, the fibers may be cut off, and quality may worsen.

As methods for obtaining the configuration in which the elastomeric binder mainly comprising the polyurethane is present inside spaces of the non-woven fabric but substantially not present inside the ultra-fine fiber bundle, dissolving the polyurethane in a solvent such as dimethylformamide, dimethylacetamide, tetrahydrofuran and dioxane, and can be preferably applied methods such as;

(1) a method in which a non-woven fabric in which island-in-sea type composite fibers convertible into ultra-fine fibers are entangled is impregnated with the polyurethane solution, coagulated in water or an aqueous solution of the organic solvent, and then, dissolving out the sea component of the island-in-sea-type composite fiber with a solvent which does not dissolve the polyurethane, or (2) a method in which a polyvinyl alcohol saponified 80% or more is imparted, to a non-woven fabric in which an island-in-sea type composite fibers convertible into ultra-fine fibers are entangled, to protect most of the fiber surface, and then, dissolving out the sea component of the island-in-sea-type composite fiber with a solvent which does not dissolve the polyvinyl alcohol, next, impregnated with a polyurethane solution, coagulated in water or an aqueous solution of an organic solvent, and then, removing the polyvinyl alcohol.

As a configuration in which the elastomeric binder is present inside the non-woven fabric, it is preferable that the binder adheres to at least part of single fibers positioned around the outermost peripheral of the ultra-fine fiber bundle, because falling off of the fibers or fluff are few, and it is possible to attain a good hand. Such a configuration can be obtained by the above-mentioned method (2). That is, because the polyvinyl alcohol protects most of the outer peripheral of the ultra-fine fiber bundle, permeation of the polyurethane inside the fiber bundle is prevented, but the polyurethane adheres to the part of outer peripheral of the fiber bundle which is not protected by the polyvinyl alcohol.

In the sheet of the present invention, a ratio of the elastomeric binder which occupies in the sheet is preferably 10 to 50 wt %, more preferably 15 to 35 wt %. By making it 10 wt % or more, it is possible to maintain sheet strength and to prevent falling off of the fibers, and making it 50 wt % or less, it is possible to prevent that a hand becomes stiff, to thereby obtain an aimed excellent nap quality.

The sheet of the present invention may be that obtained by being halved or cut into several sheets in thickness direction before being raised.

And, imparting an antistatic agent before raising treatment can be preferably applied, because the power generated from the sheet by buffing may become unlikely to accumulate on the sandpaper.

As mentioned above, the sheets of the present invention can be preferably and finally used as a napped leathery sheet obtained by raising ultra-fine fibers on at least one surface thereof.

These sheets, especially the napped leather-like sheet obtained by raising napped fibers on at least one surface of the sheet can be preferably used as covering materials such as of furniture, chair and wall covering, or covering materials for seats, ceilings, and interiors in vehicle room such as cars, street cars and air planes, as an interior material having very elegant appearance as covering materials.

EXAMPLES

Hereafter, the present invention is explained in further detail with reference to examples, but the present invention is not limited to only the following examples.

[Evaluation Method]

(1) Gelation Point of polyurethane

The value of amount of dropped water when the solution becomes slightly turbid due to starting coagulation of the polyurethane, when distilled water is dropped to 100 g of 1 wt % polyurethane solution in N,N'-dimethylformamide while stirring at a temperature condition of 25° C.±1° C., was measured. For the measurement, DMF of water content of 0.03% or less was used. In case where the polyurethane solution in DMF is slightly turbid at first, the amount of dropped water when the turbidity starts to increase by starting coagulation of the polyurethane was considered as the gelation point.

(2) Quality in Appearance

The quality in appearance of the obtained napped leather-like sheet was evaluated as follows based on subjective judgment by visual observation.

⊚: Both of nap fiber length and its separability are very good.

◯: Both of nap fiber length and its separability are good.

x: Nap fiber length is good, but its separability is not good.

xx: Nap fiber length is short and is not good.

xxx: There is almost no nap and is not good entirely.

(3) CV (Coefficient of Variation) of Fiber Fineness

A cross section in thickness direction inside the sheet is observed by a scanning electron microscope (SEM), and from its photograph, the ultra-fine fiber diameters constituting one bundle of the fiber bundles were measured, the fiber diameters were converted into each single fiber fineness, and the standard deviation of the fiber fineness of the fibers constituting the fiber bundle divided by the average fiber fineness in the bundle is expressed in percentage (%). The same measurements were made for five fiber bundles and the average thereof was defined as CV (coefficient of variation) of fiber fineness.

(4) Brush Abrasion Loss in Weight 100 nylon fibers of 11 mm length and 0.4 mm diameter were bundled, and a circular brush (9,700 nylon fibers) in which 97 units of said bundles are disposed around 6 concentric circles in 110 mm diameter circle was prepared. Using this brush, a circular sample of napped leather-like sheet (45 mm diameter) was subjected to an abrasion test in conditions of a load of 8 pounds (about 3629 g), rotation speed of 65 rpm, number of rotation of 45 cycles, and the change of the sample weights before and after the abrasion test was defined as the brush abrasion loss in weight.

(5) Durability—Hydrolysis Resistance

An obtained napped leather-like sheet was subjected to a forced deterioration test in which the sample was left for 10 weeks in an atmosphere of a temperature of 70° C. and a relative humidity of 95% in a temperature & humidity chamber sold by Tabai Espec Co., subjected to an abrasion test in conditions of a load of 12 kPa and number of abrasions of 20,000 cycles using Model 406 sold by James H. Heal & Co., as Martindale abrasion tester and the abrasion cloth SM25 sold by James H. Heal & Co., as standard abrasion cloth, and after the abrasion, the appearance of the sample was visually observed and evaluated. As the evaluation standard, a sample of which appearance was not changed from that of before abrasion was classified as grade 5, and a sample on which many pillings were generated was classified as grade 1, and classified between them in step of 0.5 grade. In addition, the level to pass in the present invention was decided as grade 4.

(6) Durability—Light Resistance

An obtained napped leather-like sheet was subjected to a forced deterioration test in which the sample was exposed to a light of 300 to 400 nm wavelength for 144 hours using xenon weatherometer sold by Suga Test Instruments Co., Ltd. in which 150 W/m² xenon lamp is used, and then subjected to an abrasion test in conditions of a load of 12 kPa and number of abrasions of 20,000 cycles using Model 406 sold by James H. Heal & Co., as Martindale abrasion tester and ABRASIVE CLOTH SM25 sold by James H. Heal & Co., as standard abrasion cloth, and after the abrasion, the appearance of the sample was visually observed and evaluated. As the evaluation standard, a sample of which appearance was not changed from that before abrasion was classified as grade 5, and a sample on which many pillings were generated was classified as grade 1, and classified between them in step of 0.5 grade. In addition, the level to pass in the present invention was decided as grade 4.

(7) Evaluation of Processability

When a sheet is subjected to a raising treatment using an endless sandpaper as described later in Example 1 (production of sheet), a sample continuously processed 3,000 m or more with little clogging of the sandpaper is evaluated as "good" and a sample not capable of being processed 3,000 m due to clogging of the sandpaper was evaluated as "not good".

[Expression of Chemical Substances]

The abbreviations of chemical substances used in Examples and Comparative examples are as follows.

PU: polyurethane

MDI: 4,4'-diphenylmethane diisocyanate

EG: ethylene glycol

DMF: N,N-dimethyl formamide

PNMOC: copolycarbonate diol derived from 1,9-nonane diol and 2-methy-1,8-octane diol represented by the following general formula (4) of number average molecular weight of 2,000.

[Formula 7]

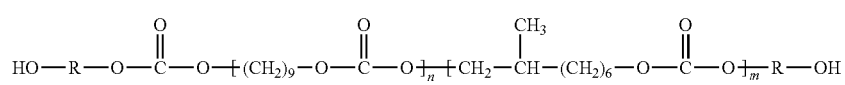

(In the formula, n and m are positive integers and a random copolymer. And R denotes an aliphatic hydrocarbon of any one of $(CH_2)_9$ and $CH_2$—$CH(CH_3)$—$(CH_2)_6$.)

PHC: polyhexamethylene carbonate diol of number average molecular weight 2,000

PHMPC: Copolycarbonate diol derived from 1,6-hexane diol and 3-methy-1,5-pentane diol represented by the following general formula (5) of number average molecular weight 2,000.

[Formula 8]

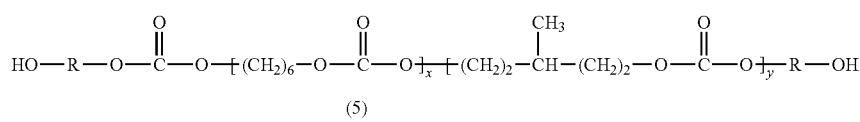

(5)

(In the formula, x and y are positive integers and a random copolymer. And R denotes an aliphatic hydrocarbon of any one of $(CH_2)_6$ and $(CH_2)_2$—$CH(CH_3)$—$(CH_2)_2$.)

PTMG: polytetramethylene glycol of number average molecular weight 2,000

PCL: polycaprolactone diol of number average molecular weight 2,000

KSi-1,000: silicone polyol having two hydroxyl groups at one end of the polydimethylsiloxane represented by the following general formula (6) of number average molecular weight 1,000.

KSi-15,000: silicone polyol having two hydroxyl groups at one end of the polydimethylsiloxane represented by the following general formula (6) of number average molecular weight 15,000.

[Formula 9]

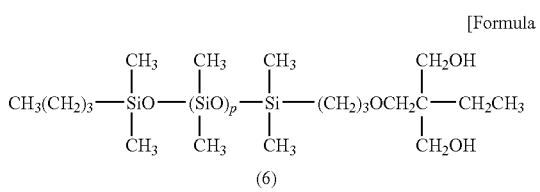

(6)

(In the formula, p is a positive integer.)

BSi-1,800: silicone polyol having one hydroxyl group respectively at both ends of the polydimethylsiloxane represented by the following general formula (7) of number average molecular weight 1,800.

[Formula 10]

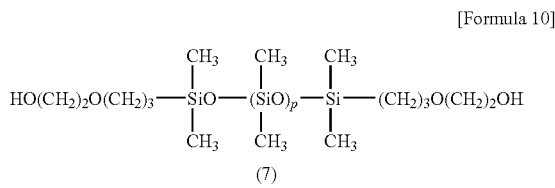

(7)

(In the formula, p is a positive integer.)

Example 1

(Preparation of Non-Woven Fabric)

An island-in-sea type composite fiber was spun using polystyrene as the sea component and polyethylene terephthalate as the island component, by an island-in-sea-type composite spinneret of 16 islands in a composite ratio of the sea component 55 wt % and the island component 45 wt %, and then it was subjected to a drawing, crimping and cutting to prepare a raw fiber for a non-woven fabric.

The obtained raw fiber was made into a web by a crosslapper and made into a non-woven fabric by a needle punching treatment.

This non-woven fabric made of the island-in-sea-type composite fiber is impregnated with an aqueous solution of 10% polyvinyl alcohol of 87% saponification and then dried. After that, the sea component, polystyrene, was removed by extraction in trichloroethylene, and dried to obtain a non-woven fabric comprising ultra-fine fibers of single fiber fineness of 0.1 dtex.

(Preparation of polyurethane)

PNMOC 60 wt % and PHMPC 40 wt % as polyol and MDI as organic diisocyanate in such an amount that the mol ratio of total polyol to MDI becomes 1 to 3, were put with DMF as solvent into a four necked separable flask equipped with a condenser, stirred and reacted in nitrogen atmosphere at 40 to 60° C., and further, EG as chain extender in a state diluted by DMF was dropped and reacted at 50 to 60° C., and then gradually diluted by DMF, and after about 10 hours, obtained a PU solution of solid component 25%. The gelation point of the obtained polyurethane was 3.5 ml.

(Production of Sheet)

The above-mentioned non-woven fabric comprising the ultra-fine fibers was immersed into a solution in which the concentration of the above-mentioned polyurethane solution in DMF was adjusted to 12%, the deposited amount of PU solution was controlled by a squeezing roll and then, the polyurethane was coagulated at 30° C. in an aqueous solution of 30% DMF concentration. After that, the polyvinyl alcohol and the DMF were removed by hot water of 90° C., and after drying, it was immersed in a mixed aqueous solution of silicone emulsion and nonionic antistatic agent ("Elenite 139" sold by Takamatsu Fat & Oil Co., Ltd.) and dried to obtain a sheet of PU content of 32 wt %, silicone content of 0.2 wt %, antistatic agent content of 0.1 wt %. This sheet was raised on one surface by an endless sandpapers of 150 mesh, and next, 240 mesh and dyed with a disperse dye to obtain a napped leather-like sheet.

A cross section in thickness direction of the obtained napped leather-like sheet was observed by a scanning electron microscope (SEM) and it was found that the polyurethane is substantially not present inside the ultra-fine fiber bundle and partially adheres to single fibers positioned at outermost peripheral of the ultra-fine fiber bundle. And, the CV (coefficient of variation) of fiber fineness was 7.5%.

The obtained napped leather-like sheet was excellent in nap fiber length, nap fiber separability, and had an elegant appearance. In addition, it had a good hand with a suitable resilience and voluminous feeling. Brush abrasion loss in weight was little as 15 mg and both of hydrolysis resistance and light resistance which are evaluation of durability were grade 4.5 respectively which means to have an excellent durability.

Examples 2 to 4 and Comparative Examples 1 to 5

Napped leather-like sheet were prepared in the same way as Example 1 except, in production of polyurethane, changing the composition and the weight ratio of the polyol to those indicated in Table 1, respectively.

Cross sections in thickness direction of respective Examples and Comparative examples of the napped leather-like sheets were observed by a scanning electron microscope (SEM) and it was found that the polyurethane is substantially not present inside the ultra-fine fiber bundle and partially adheres to single fibers positioned at outermost peripheral of the ultra-fine fiber bundle.

In table 1, the polyurethane composition and gelation point of the polyurethane and quality in appearance, brush abrasion loss in weight and durability of respective Examples and Comparative examples are shown.

it was subjected to a drawing, crimping and cutting to prepare a raw fiber for a non-woven fabric.

The obtained raw fiber was made into a web by a crosslapper and made into a non-woven fabric by a needle punching treatment.

This non-woven fabric made of the island-in-sea-type composite fiber is impregnated with an aqueous solution of 10% polyvinyl alcohol of 87% saponification and then dried. After that, the sea component, polystyrene, was removed by extraction in trichloroethylene, and dried to obtain a non-woven fabric comprising entangled fiber bundles of ultra-fine fibers of single fiber fineness of 0.1 dtex.

(Preparation of polyurethane)

PNMOC 60 wt % as the polycarbonate diol (A), PHMPC 40 wt % as polycarbonate diol (B), KSi-15,000 2 wt % as the silicone polyol (C) and MDI as organic diisocyanate in such an amount that the mol ratio of total polyol {(A)+(B)+(C)} to MDI becomes 1 to 3, were put with DMF as solvent into a four necked separable flask equipped with a condenser, stirred and reacted in nitrogen atmosphere at 40 to 60° C., and then, EG

TABLE 1

| | PU Polyol composition (weight ratio) | PU Gelation point (ml) | Quality in appearance | Brush abrasion loss in weight (mg) | Durability Hydrolysis resistance | Light resistance |
|---|---|---|---|---|---|---|
| Example 1 | PNMOC (60) PHMPC (40) | 3.5 | ⊚ | 15 | Grade 4.5 | Grade 4.5 |
| Example 2 | PNMOC (80) PHMPC (20) | 2.8 | ⊚ | 19 | Grade 4.0 | Grade 4.0 |
| Example 3 | PNMOC (20) PHMPC (80) | 5.5 | ○ | 12 | Grade 4.5 | Grade 4.5 |
| Example 4 | PNMOC (60) PHC (40) | 3.3 | ○ | 12 | Grade 4.5 | Grade 4.5 |
| Comparative example 1 | PNMOC (100) | 2.0 | x | 25 | Grade 3.5 | Grade 3.5 |
| Comparative example 2 | PHC (100) | 6.5 | xxx | 8 | Grade 4.5 | Grade 4.5 |
| Comparative example 3 | PHC (70) PCL (30) | 7.0 | xx | 10 | Grade 3.0 | Grade 4.5 |
| Comparative example 4 | PHC (70) PTMG (30) | 4.7 | ○ | 22 | Grade 4.5 | Grade 1.0 |
| Comparative example 5 | PTMG (70) PCL (30) | 3.2 | ⊚ | 28 | Grade 2.0 | Grade 1.0 |

All of the napped leather-like sheets of Examples 1 to 4 have an elegant quality of appearance, and are excellent in brush abrasion loss in weight and durability. The sheets of Comparative examples 1 to 3 were inferior in quality of appearance and the sheet of Comparative examples 4 and 5 were inferior in brush abrasion loss in weight and durability.

However, in processability, in every one of Examples 1 to 4 and Comparative examples 1 to 5, clogging of endless sandpaper at buffing became serious before process length of 3,000 m was achieved, and the processability was "not good".

Example 5

(Preparation of Non-Woven Fabric)

An island-in-sea type composite fiber was spun using polystyrene as the sea component and polyethylene terephthalate as the island component, by an island-in-sea-type composite spinneret of 16 islands in a composite ratio of the sea component 55 wt % and the island component 45 wt %, and then as chain extender in a state diluted with DMF was dropped and reacted at 50 to 60° C., and then gradually diluted by DMF, and after about 10 hours, obtained a PU solution of solid component 25%. The gelation point of the obtained polyurethane was 3.5 ml.

(Production of Sheet)

The above-mentioned non-woven fabric comprising the ultra-fine fibers was immersed into a solution in which the concentration of the above-mentioned polyurethane solution in DMF was adjusted to 12%, the deposited amount of PU solution was controlled by a squeezing roll and then, the polyurethane was coagulated at 30° C. in an aqueous solution of 30% DMF concentration. After that, the polyvinyl alcohol and the DMF were removed by hot water of 90° C., and after drying, it was immersed in an aqueous solution of nonionic antistatic agent ("Elenite 139 sold by Takamatsu Fat & Oil Co., Ltd.) and dried to obtain a sheet of PU content of 32 wt % and antistatic agent content of 0.1 wt %. This sheet was raised on one surface by an endless sandpapers of 150 mesh, and next, of 240 mesh and dyed with a disperse dye to obtain a napped leather-like sheet.

A cross section in thickness direction of the obtained napped leather-like sheet was observed by a scanning electron microscope (SEM) and it was found that the polyurethane is substantially not present inside the ultra-fine fiber bundle and partially adheres to single fibers positioned around outermost peripheral of the ultra-fine fiber bundle. And, the CV (coefficient of variation) of fiber fineness was 7.3%.

The obtained napped leather-like sheet was excellent in nap fiber length and nap separability, and had an elegant appearance. In addition, it had a good hand with a suitable resilience and voluminous feeling. The brush abrasion loss in weight was little as 12 mg and both of hydrolysis resistance and light resistance which are evaluation of durability were grade 4.5 respectively which means to have an excellent durability. Furthermore, in the raising treatment, after 3,000 m continuous processing, clogging of the sandpaper was little and the processability was "good".

Examples 6 to 11

A napped leather-like sheets were prepared in the same way as Example 5 except, in production of polyurethane, changing the composition and the weight ratio of the polyol to those indicated in Table 2, respectively.

As for processability of each Example, clogging of sandpaper was little after 3,000 m continuous processing, and the processability was "good".

In table 2, the polyurethane composition and quality in appearance, brush abrasion loss in weight and durability of the obtained sheet of each Examples are shown.

Every one of the napped leather-like sheets of Examples 5 to 9 in which the polyurethane having the polyorganosiloxane skeleton in its side chain prepared by using the silicone polyol having two hydroxyl groups at its one end had an elegant quality of appearance even if it was not immersed in silicone emulsion before raising treatment by sandpaper, and was excellent in the brush abrasion loss in weight and durability. In particular, those in which the silicone polyol of number average molecular weight 15,000 (KSi-15,000) was used were excellent in quality of appearance even if the used amount was small. On the other hand, Example 10 in which silicone polyol (BSi-1,800) which has one hydroxyl group at both ends of the polydimethylsiloxane was used was, compared to Examples 5 and 9 in which the silicone polyol having two hydroxyl groups at one end was used, inferior in quality of appearance. In order to obtain a good quality of appearance by using the silicone polyol (BSi-1,800) having one hydroxyl group respectively at both ends of polydimethylsiloxane, it was necessary to contain 10 wt % as polyol composition, but it was excessive and the light resistance became inferior.

INDUSTRIAL APPLICABILITY

By the present invention, it becomes possible to provide a napped leather-like sheet having an elegant appearance of nap, and was excellent in durability such as hydrolysis resistance and light resistance. As a result, an advantageous characteristic that, even by a long term use, deterioration of nap quality depending on time is little like a suede, can be attained, and can be preferably used as interior material having very elegant appearance as covering materials such as of furniture, chair and wall covering, or covering materials such as for seat, ceiling and interior material of vehicle room such as of cars, street cars and air planes.

TABLE 2

|  | PU Polyol composition (weight ratio) | PU Gelation point (ml) | Quality in appearance | Brush abrasion loss in weight (mg) | Durability Hydrolysis resistance | Light resistance |
|---|---|---|---|---|---|---|
| Example 5 | PNMOC (60) PHMPC (40) KSi-15,000 (2) | 3.5 | ⊚ | 12 | Grade 4.5 | Grade 4.5 |
| Example 6 | PNMOC (80) PHMPC (20) KSi-15,000 (2) | 2.8 | ⊚ | 17 | Grade 4.0 | Grade 4.0 |
| Example 7 | PNMOC (20) PHMPC (80) KSi-15,000 (2) | 5.6 | ○ | 10 | Grade 4.5 | Grade 4.5 |
| Example 8 | PNMOC (60) PHMPC (40) KSi-15,000 (5) | 3.6 | ⊚ | 10 | Grade 4.5 | Grade 4.0 |
| Example 9 | PNMOC (60) PHMPC (40) KSi-1,000 (2) | 3.5 | ○ | 11 | Grade 4.5 | Grade 4.5 |
| Example 10 | PNMOC (60) PHMPC (40) BSi-1,800 (2) | 3.5 | xx | 12 | Grade 4.5 | Grade 4.5 |
| Example 11 | PNMOC (60) PHMPC (40) BSi-1,800 (10) | 3.6 | ○ | 10 | Grade 4.5 | Grade 2.5 |

The invention claimed is:

1. A sheet like product comprising a non-woven fabric in which ultra-fine fibers of a single fiber fineness of 0.5 dtex or less are entangled and an elastomeric binder mainly composed of a polyurethane, wherein said polyurethane is a polycarbonate-based polyurethane having a polycarbonate skeleton represented by both of the following general formulas (1) and (2), and having a gelation point of 2.5 ml to 6 ml

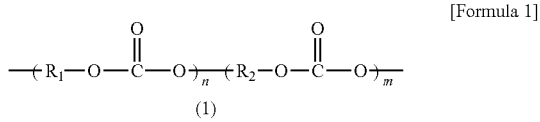

wherein $R_1$ and $R_2$ are aliphatic hydrocarbon groups with 7 to 11 carbons, and they may be same or different, n and m are positive integers, and when $R_1$ and $R_2$ are different, it is a block copolymer or a random copolymer,

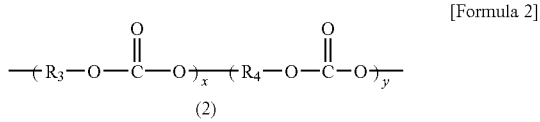

wherein $R_3$ and $R_4$ are aliphatic hydrocarbon groups with 3 to 6 carbons, and they may be same or different, x and y are positive integers, and when $R_3$ and $R_4$ are different, it is a block copolymer or a random copolymer.

2. A sheet like product according to claim 1, wherein said polyurethane further has a side chain containing a polyorganosiloxane skeleton represented by the following general formula (3),

[Formula 3]

wherein $R_5$ and $R_6$ are aliphatic hydrocarbon groups or an aryl groups, and they may be same or different, and, p is a positive integer.

3. A sheet like product according to claim 1, wherein the gelation point is from 3 ml to 5 ml.

4. A sheet like product according to claim 1, wherein said polyurethane is a polyurethane obtained by reaction of a polycarbonate diol (A) having hydroxyl group at both ends of a polymer chain having the polycarbonate skeleton represented by said general formula (1), a polycarbonate diol (B) having hydroxyl group at both ends of a polymer chain having the polycarbonate skeleton represented by said general formula (2), an organic diisocyanate and a chain extender.

5. A sheet like product according to claim 2, wherein said polyurethane is a polyurethane obtained by reaction of a polycarbonate diol (A) having hydroxyl group at both ends of a polymer chain having the polycarbonate skeleton represented by said general formula (1), a polycarbonate diol (B) having hydroxyl group at both ends of a polymer chain having the polycarbonate skeleton represented by said general formula (2), a silicone polyol (C) having two hydroxyl groups at one end only of a polymer chain having the polyorganosiloxane skeleton represented by said general formula (3), an organic diisocyanate and a chain extender.

6. A sheet like product according to claim 5, wherein a number average molecular weight (Mn) of said silicone polyol (C) is more than 10,000 to 20,000.

7. A sheet like product according to claim 5, wherein a ratio of said silicone polyol (C) to the total sum of said polycarbonate diol (A) and said polycarbonate diol (B) is from 0.1 wt % to 5 wt %.

8. A sheet like product according to claim 1, wherein all of $R_1$, $R_2$, $R_3$ and $R_4$ described in said general formulas (1) and (2) are different aliphatic hydrocarbon groups.

9. A sheet like product according to claim 1, wherein at least one of $R_1$ and $R_2$ described in said general formula (1) is an aliphatic hydrocarbon group from which methyl group or ethyl group is branched.

10. A sheet like product according to claim 1, wherein at least one of $R_3$ and $R_4$ described in said general formula (2) is an aliphatic hydrocarbon group from which methyl group or ethyl group is branched.

11. A sheet like product according to claim 1, wherein said non-woven fabric is a non-woven fabric in which an ultra-fine fiber bundle is entangled, and said elastomeric binder is substantially not present inside said ultra-fine fiber bundle.

12. A sheet like product according to claim 11, wherein said elastomeric binder adheres to at least a part of single fibers positioned around outermost peripheral of said ultra-fine fiber bundle.

13. A sheet like product according to claim 1, wherein a single fiber fineness CV in an ultra-fine fiber bundle is 10% or less.

14. A sheet like product according to claim 1, wherein said ultra-fine fiber is made of a polyester.

15. A sheet like product according to claim 1, wherein a ratio of said elastomeric binder occupied in the sheet like product is from 10 wt % to 50 wt.

16. A sheet like product according to claim 1, wherein, at least one surface of the sheet like product, said ultra-fine fibers are raised.

17. An interior material made of the sheet like product described in any one of claims 1 to 16.

18. A sheet like product according to claim 1, wherein said polyurethane does not include a polyester diol or a polyether diol.

* * * * *